(12) United States Patent
Fernandez

(10) Patent No.: US 9,803,678 B2
(45) Date of Patent: Oct. 31, 2017

(54) ARC WELD STUD HAVING A FORMING THREAD

(71) Applicant: Nestor Fernandez, Cincinnati, OH (US)

(72) Inventor: Nestor Fernandez, Cincinnati, OH (US)

(73) Assignee: Akko Fastener Inc., Cincinnati, OH (US)

( * ) Notice: Subject to any disclaimer, the term of this patent is extended or adjusted under 35 U.S.C. 154(b) by 0 days.

(21) Appl. No.: 14/823,454

(22) Filed: Aug. 11, 2015

(65) Prior Publication Data
US 2016/0040706 A1    Feb. 11, 2016

Related U.S. Application Data

(60) Provisional application No. 62/035,709, filed on Aug. 11, 2014.

(51) Int. Cl.
*F16B 37/06* (2006.01)
*B23K 9/20* (2006.01)
*B23K 35/02* (2006.01)

(52) U.S. Cl.
CPC ............ *F16B 37/061* (2013.01); *B23K 9/207* (2013.01); *B23K 35/0288* (2013.01)

(58) Field of Classification Search
CPC ........ F16B 5/08; F16B 25/0068; F16B 25/10; F16B 33/02; F16B 37/06; F16B 37/061; B23K 9/207; B23K 35/0288
USPC ........................................................ 411/171
See application file for complete search history.

(56) References Cited

U.S. PATENT DOCUMENTS

| | | | |
|---|---|---|---|
| 2,477,430 A | 7/1949 | Swanstrom | |
| 2,931,888 A | 4/1960 | Thome | |
| 4,323,326 A | 4/1982 | Okada et al. | |
| 5,054,980 A * | 10/1991 | Bidefeld | B23K 35/0288 228/2.3 |
| 5,244,327 A | 9/1993 | Whitesell | |
| 5,326,208 A * | 7/1994 | Werner | F16B 37/002 411/437 |
| 5,393,164 A * | 2/1995 | Renner | B23K 9/208 219/99 |
| 5,579,986 A | 12/1996 | Sherry et al. | |
| 5,598,994 A * | 2/1997 | Olewinski | F16B 37/0842 248/73 |
| 5,909,990 A * | 6/1999 | Gombos | F16B 37/005 411/302 |
| 6,357,110 B1 * | 3/2002 | Shipp | H01R 4/34 29/432.2 |
| 6,860,687 B1 * | 3/2005 | Schmitt | B23K 35/0288 148/247 |

(Continued)

FOREIGN PATENT DOCUMENTS

CN          2900896 Y       5/2007

*Primary Examiner* — Roberta Delisle
(74) *Attorney, Agent, or Firm* — Wood Herron & Evans LLP

(57) ABSTRACT

An arc weld stud for fastening a member to a structure with an unthreaded nut includes a weld end having an ignition tip, and a threaded portion defined by a thread configured to form a corresponding counter-thread into a smooth bore of the unthreaded nut, wherein the arc weld stud comprises a material that is harder than the material of the unthreaded nut.

2 Claims, 1 Drawing Sheet

(56) References Cited

U.S. PATENT DOCUMENTS

| | | | |
|---|---|---|---|
| 6,875,947 B2 * | 4/2005 | Sichtermann | B21K 1/44 |
| | | | 219/78.01 |
| 7,416,374 B2 * | 8/2008 | Breihan | F16B 33/02 |
| | | | 285/334 |
| 8,641,342 B2 | 2/2014 | Drexler et al. | |
| 2005/0008427 A1 | 1/2005 | Huber et al. | |
| 2010/0288736 A1 * | 11/2010 | Miura | B23K 9/207 |
| | | | 219/99 |

* cited by examiner

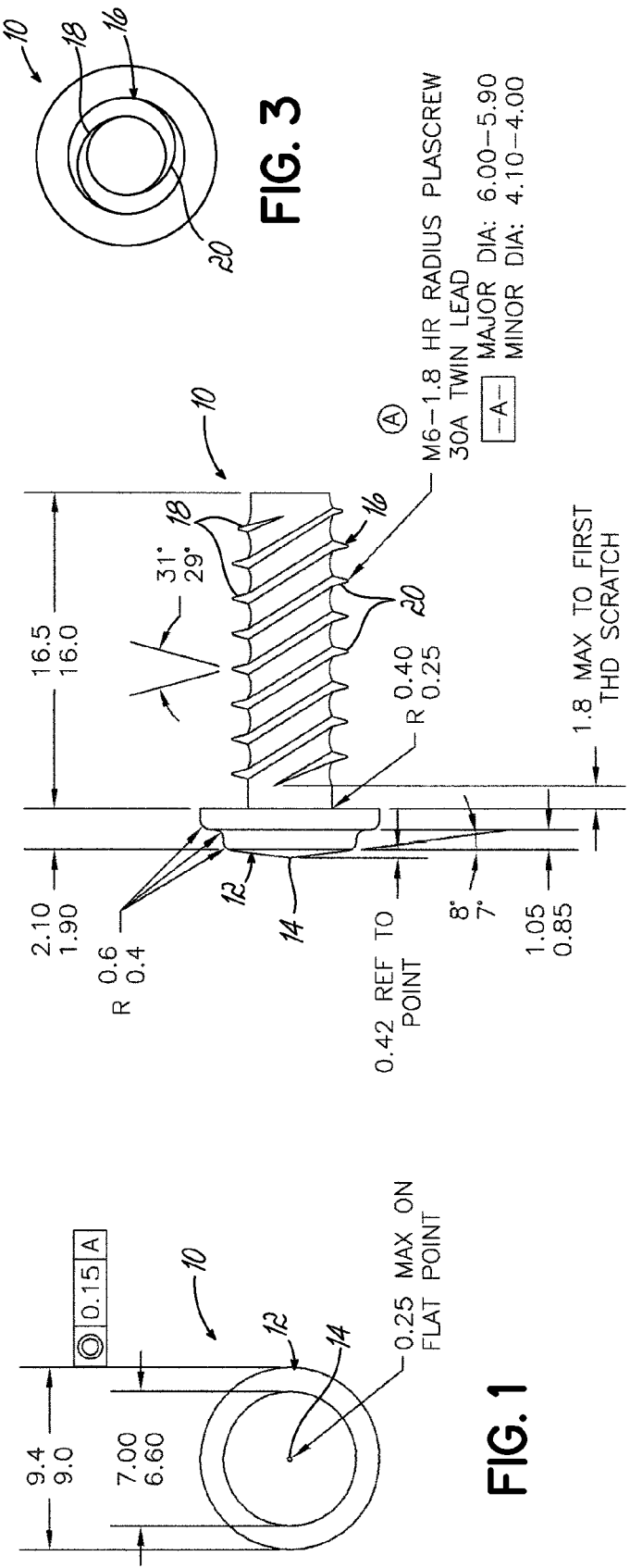

ARC WELD STUD HAVING A FORMING THREAD

CROSS-REFERENCE TO RELATED APPLICATIONS

This application claims the benefit of priority to U.S. Provisional Patent Application Ser. No. 62/035,709, filed Aug. 11, 2014, the disclosure of which is incorporated by reference herein in its entirety.

TECHNICAL FIELD

The present invention relates to an arc weld stud and, more particularly, to an arc weld stud having a twin lead forming thread.

BACKGROUND

Arc weld studs are commonly used in many industries to facilitate the attachment of various structures. For example, arc weld studs are widely used in the automobile industry for fastening a member (e.g. dashboards, fastening elements, etc.) to sheet metal, such as the sheet metal of the body of a motor vehicle, with a threaded metal stud that is fastened to the structural part in short-time arc welding. A threaded nut, such as a lock nut, may be screwed onto the stud, by which the member is fastened to the structural part. Arc studs are also frequently used to fasten elements of the interior fittings of a vehicle to the vehicle body.

The threaded stud is welded onto a metal sheet of the body in so-called short-time arc welding. Short-time arc welding is also known as stud welding, in which a metal threaded stud is placed on the sheet metal of the body. A pilot current is then turned on and the metal stud is slightly lifted off from the sheet metal of the body. At the same time, an arc is drawn. Then a welding current is turned on, so that the facing surfaces of metal stud and body sheet metal are fused. The metal stud is then again lowered onto the sheet metal of the body, so that the melts combine. The welding current is turned off and the whole fused mass solidifies. A member may then be fastened to the stud, such as by a threaded lock nut.

Frequently, hundreds of such studs are used per vehicle. Therefore, a need exists to provide an arc weld stud that facilitates speedy and cost effective fastening.

BRIEF DESCRIPTION OF THE DRAWINGS

FIG. 1 is a top view of an arc weld stud in accordance with the principles of the present invention.
FIG. 2 is side view of the arc weld stud of FIG. 1.
FIG. 3 is a bottom view the arc weld stud of FIG. 1.

DETAILED DESCRIPTION

Referring now to FIGS. 1-3, an exemplary arc weld stud 10 in accordance with the principles of the present invention is shown. The stud 10 may include a weld end 12 having an ignition tip 14, and a threaded portion 16. In one embodiment, the threaded portion 16 may be defined by a double start thread, also known as a twin lead thread. For example, the threaded portion may be defined by first and second threads 18, 20 wrapped around the stud's body. The arc weld stud 10 may comprise a relatively strong material, such as a hard metal, so that the first and second threads 18, 20 may be capable of forming corresponding threads into an unthreaded nut (not shown), which may comprise a relatively softer material, such as a plastic. As such, the threads 18, 20 of the stud 10 may be described generally as plastic cutting, or forming.

An arc weld stud 10 may be positioned at a surface of a workpiece or structure, such as an automobile body, and a collet of a weld gun may be positioned substantially over the stud 10 such that the threads 18, 20 of the stud 10 contact (or nearly contact) the inner cylindrical surface of the collet. The weld spring of the weld gun may then be compressed and subsequently the trigger may be pressed to discharge the stored energy as a high current pulse through the stud 10, producing an electric arc to melt the ignition tip 14 and a portion of the weld end 12 as well as a portion of the workpiece. The weld spring may then plunge the stud 10 into the melted pool of metal, and the collet of the weld gun may be withdrawn from the stud 10. As the molten pool of metal solidifies, the stud 10 and workpiece may fuse into a single homogeneous structure. Because the stud 10 includes first and second threads 18, 20, the stud 10 provides more surface contact between the stud 10 and the collet than a stud having a single thread, and therefore provides improved electrical conduction and faster welding.

Thereafter, a member, such as a dashboard, for example, may be positioned about the stud 10. In order to secure the member in place, an unthreaded nut having a smooth bore may be turned onto the stud 10 such that the threads 18, 20 of the stud 10 cut or form corresponding counter-threads into the smooth bore as the nut is turned. To facilitate this process, the unthreaded nut may be constructed of a material that is relatively softer than the material of the stud 10. For example, the unthreaded nut may be constructed of a plastic material, while the stud 10 may be constructed of a metal material. In one embodiment, the unthreaded nut may be constructed of a glass-reinforced composite material. For example, the unthreaded nut may be constructed of a composite material comprising between about 22% glass and about 85% glass. Since the stud 10 thereby provides "form-threading" of the nut, manufacturing costs are greatly reduced as the nut does not require separate threading. Moreover, the double start thread of the stud 10 provides quicker fastening, since a double-thread stud will theoretically screw into a nut twice as fast as a single-thread stud having the same thread spacing. In addition, the double start thread of the stud 10 provides more surface area and therefore better retention of the nut than a single start thread.

While the unthreaded nut has been described above as being formed from plastic material and the stud 10 as being formed from metal, it will be appreciated that the nut may alternatively be formed from metal or other suitable materials that are softer than the material of the stud 10 so that the stud 10 will form corresponding threads on the nut upon initial installation. Moreover, it will be further appreciated that a nut may comprise any body having a bore that may be turned onto the stud 10.

In another embodiment, the threaded portion 16 may be defined by any other style of threading, such as, for example, a single start thread.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described.

Accordingly, departures may be made from such details without departing from the scope or spirit of the general inventive concept.

What is claimed is:

1. A fastener assembly for fastening a member to a structure with an unthreaded nut, the fastener assembly comprising:

an arc weld stud comprising a weld end having an ignition tip configured to be joined to a substrate by arc welding, and a threaded portion defined by a thread configured to form a corresponding counter-thread into a smooth bore of the unthreaded nut;

wherein said arc weld stud comprises a material that is harder than the material of the unthreaded nut; and an unthreaded nut having a smooth bore, wherein said unthreaded nut comprises a plastic material and said thread of said arc weld stud forms a corresponding counter-thread into said smooth bore of said unthreaded nut, wherein said threaded portion is defined by a double-start thread.

2. A method of forming a threading fastener, comprising:

forming a stud having a first end, a second end, and a shank;

forming a thread on the shank; and joining an unthreaded nut to the shank by turning the unthreaded nut on the shank such that the thread forms a corresponding counter-thread into a bore of the unthreaded nut;

wherein the first end of the stud defines an ignition tip configured to be joined to a substrate by arc welding, and the nut comprises plastic material, and wherein forming a thread on the shank includes forming a double-start thread on the shank.

* * * * *